US008864203B1

(12) United States Patent
Menduni

(10) Patent No.: US 8,864,203 B1
(45) Date of Patent: Oct. 21, 2014

(54) PIPE LIFTING SYSTEM AND METHOD

(75) Inventor: Michael Joseph Menduni, Houma, LA (US)

(73) Assignee: Expert E&P Consultants, LLC, Madisonville, LA (US)

( * ) Notice: Subject to any disclaimer, the term of this patent is extended or adjusted under 35 U.S.C. 154(b) by 371 days.

(21) Appl. No.: 13/251,995

(22) Filed: Oct. 3, 2011

Related U.S. Application Data

(60) Provisional application No. 61/418,833, filed on Dec. 1, 2010.

(51) Int. Cl.
*B66C 1/10* (2006.01)
*B66C 1/66* (2006.01)
*F16G 15/04* (2006.01)

(52) U.S. Cl.
USPC .............................................. 294/215; 59/86

(58) Field of Classification Search
USPC ............ 294/215, 89, 82.1; 403/78, 164, 194, 403/101, 149; 410/101; 411/400, 383; 59/85, 86, 93
See application file for complete search history.

(56) References Cited

U.S. PATENT DOCUMENTS

| | | | | | |
|---|---|---|---|---|---|
| 1,857,091 | A * | 5/1932 | Von Der Horst | ............. | 294/82.1 |
| 4,573,714 | A * | 3/1986 | Sweeney | ....................... | 285/363 |
| 4,750,445 | A * | 6/1988 | Awalt, Jr. | ....................... | 114/200 |
| 5,707,168 | A * | 1/1998 | Sharon | ......................... | 294/67.2 |
| 6,023,927 | A * | 2/2000 | Epstein | ............................ | 59/86 |
| 6,039,500 | A * | 3/2000 | Kwon | .......................... | 294/215 |
| 6,401,825 | B1 | 6/2002 | Woodrow | | |
| 7,448,823 | B2 * | 11/2008 | Silva | ............................ | 403/349 |
| 7,540,140 | B1 * | 6/2009 | Diaz et al. | ......................... | 59/86 |
| 7,766,580 | B2 | 8/2010 | Dartford et al. | | |
| 8,171,715 | B2 * | 5/2012 | Segura | ............................. | 59/86 |
| 2009/0136327 | A1 | 5/2009 | Often et al. | | |
| 2011/0265992 | A1 * | 11/2011 | Pearson | ....................... | 166/267 |

* cited by examiner

*Primary Examiner* — Paul T Chin
(74) *Attorney, Agent, or Firm* — Jones Walker LLP

(57) ABSTRACT

A pipe lifting system including a lift bushing having a first outer surface, a second outer surface, a shoulder interconnecting the first and second outer surfaces, an inner bore extending from a first end surface to a second end surface, and a fastening mechanism operatively associated with the first outer surface or the second outer surface. The lift bushing is dimensioned to be inserted through a flange hole in a flange of a pipe to facilitate lifting of the pipe. The shoulder engages a shoulder of the flange hole. The fastening mechanism retains the lift bushing within the flange hole. The lift bushing is capable of remaining within the flange hole when the flange is attached to a flange of another pipe. The pipe lifting system may also include a shackle assembly capable of selectively engaging the inner bore of the lift bushing.

19 Claims, 4 Drawing Sheets

PIPE LIFTING SYSTEM AND METHOD

CROSS-REFERENCE TO RELATED APPLICATION

This application claims the benefit of and priority to U.S. Provisional Patent Application No. 61/418,833, filed on Dec. 1, 2010, which is incorporated herein by reference.

SUMMARY OF THE INVENTION

A lift bushing having a first outer surface, a second outer surface, a shoulder interconnecting the first and second outer surfaces, an inner bore extending from a first end surface of the lift bushing to a second end surface of the lift bushing, and a fastening mechanism operatively associated with the first outer surface or the second outer surface. The lift bushing is dimensioned to be inserted through a flange hole in a flange of a pipe to facilitate lifting the pipe. The fastening mechanism may be capable of retaining the lift bushing in the flange. The second end surface and a connection surface of the flange may be coplanar when the lift bushing is inserted through the hole in the flange. The first and second outer surfaces may be generally cylindrically shaped. The first and second outer surface may have differing diameters. The shoulder may engage a shoulder in the flange hole. The fastening mechanism may include a fastener bore in a first end of the lift bushing. The fastener bore may be dimensioned to receive a fastener, which may have a threaded portion for threadedly engaging the fastener bore. The inner bore may be dimensioned to receive a portion of a shackle assembly to facilitate lifting the pipe.

A pipe lifting system may include a flange operatively attached to a pipe. The flange may include a flange hole. The pipe lifting system may further include a lift bushing having a first outer surface, a second outer surface, a shoulder interconnecting the first and second outer surfaces, an inner bore extending from a first end surface to a second end surface, and a fastening mechanism operatively associated with the first or second outer surface. The lift bushing may be dimensioned to be inserted through the flange hole to facilitate lifting of the pipe. The fastening mechanism may be capable of retaining the lift bushing within the flange hole. The pipe lifting system may further include a shackle assembly capable of selectively engaging the lift bushing. The shackle assembly may be capable of selectively engaging the inner bore of the lift bushing. The shackle assembly may be operatively connected to a lifting device for lifting the pipe. The flange may be integrally formed with the pipe. The pipe include a marine riser. The lifting device may include a crane.

The shoulder of the lift bushing may be capable of engaging a shoulder in the flange hole. The fastening mechanism may include a fastener bore in a first end of the lift bushing. The fastener bore may be dimensioned to receive a fastener. The fastener may include a threaded portion capable of threadedly engaging the fastener bore. The shackle assembly may include a shackle with a first bore and a second bore, and both first and second bores may be capable of being aligned with an inner bore of the lift bushing. The shackle assembly may also include a bolt insertable through the first bore of the shackle, the inner bore of the lift bushing, and the second bore of the shackle. The shackle assembly may further include a nut capable of threadedly engaging the bolt to secure the shackle to the lift bushing.

The pipe lifting system may further include a second flange, a second lift bushing, and a second shackle assembly. The second flange may be operatively attached to a second end of the pipe. The second flange may include a second flange hole. The second lift bushing may be insertable through the second flange hole. The second shackle assembly may be capable of selectively engaging an inner bore of the second lift bushing. The second shackle assembly may be operatively connected to the lifting device for lifting the pipe. The first and second flanges may be integrally formed with the pipe. The pipe may include a marine riser.

In yet another embodiment, a method of lifting a pipe includes providing a pipe lifting system, which includes a flange operatively attached to the pipe and having a flange hole, a lift bushing, and a shackle assembly. The lift bushing may have a first outer surface, a second outer surface, a shoulder interconnecting the first and second outer surfaces, an inner bore extending from a first end surface to a second end surface, and a fastening mechanism operatively associated with the first or second outer surface. The lift bushing may be dimensioned to be inserted through the flange hole. The fastening mechanism may be capable of retaining the lift bushing within the flange hole. The method may include inserting the lift bushing through the flange hole, and securing the lift bushing in the flange hole with the fastening mechanism. The method may also include selectively engaging the inner bore of the lift bushing with the shackle assembly, operatively attaching the shackle assembly to a lifting device, and lifting the pipe with the lifting device. The method may further include lowering the pipe with the lifting device, selectively disengaging the shackle assembly from the inner bore of the lift bushing, and operatively connecting a flange of a second pipe to the flange while retaining the lift bushing within the flange hole. The lifting device may be a crane, and the pipe may be a marine riser.

The pipe lifting assembly may further include a second flange operatively attached to the pipe and having a second flange hole, a second lift bushing, and a second shackle assembly. The method may further include inserting the second lift bushing through the second flange hole, securing the second lift bushing in the second flange hole with a fastening mechanism of the second lift bushing, selectively engaging an inner bore of the second lift bushing with the second shackle assembly, operatively attaching the second shackle assembly to the lifting device, selectively disengaging the second shackle assembly from the inner bore of the second lift bushing, and operatively connecting a flange of a third pipe to the second flange while retaining the second lift bushing within the second flange hole.

DETAILED DESCRIPTION OF THE PREFERRED EMBODIMENTS

Figure 1:
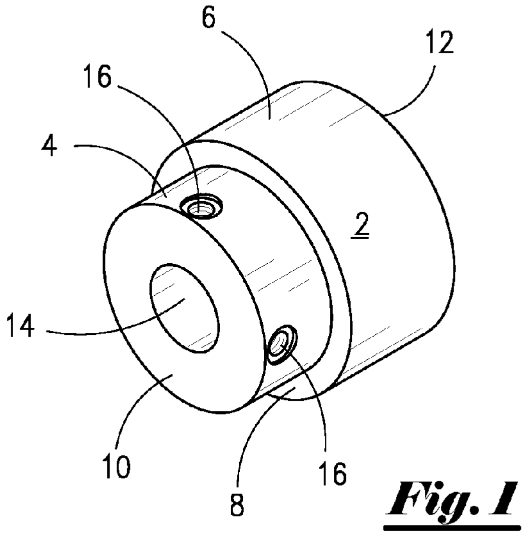
FIG. 1 is an isometric view of a lift bushing.
Figure 2:
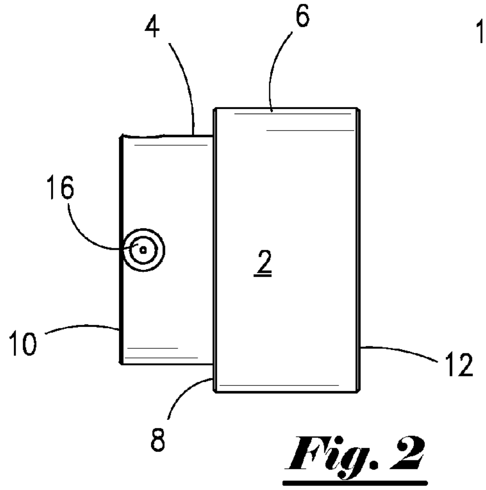
FIG. 2 is a side view of the lift bushing.

With reference to FIGS. 1 and 2, lift bushing 2 may have first outer surface 4, second outer surface 6, and shoulder 8 interconnecting first and second outer surfaces 4, 6. Lift bushing 2 may have any shape. In a preferred embodiment, lift bushing 2 is generally cylindrically shaped. First outer surface 4 may have a smaller diameter than second outer surface 6. First outer surface 4 may terminate at first end surface 10, and second outer surface 6 may terminate at second end surface 12. Lift bushing 2 may also include inner bore 14, which may extend from first end surface 10 to second end surface 12. Lift bushing 2 may further include one or more fastener bores 16. In a more preferred embodiment, fastener bores 16 may be threaded.

Figure 3:
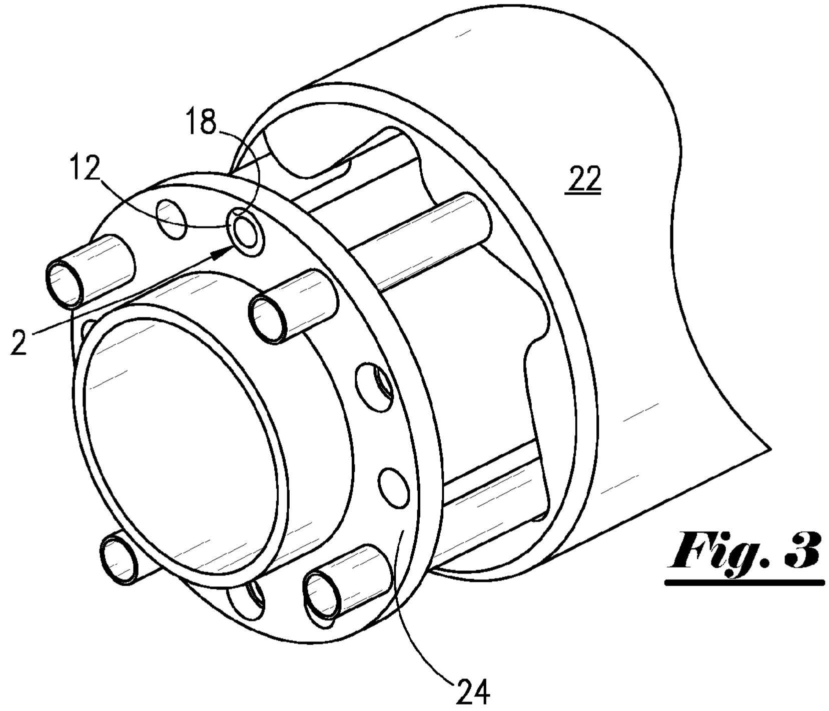
FIG. 3 is a front isometric view of the lift bushing inserted through a pipe flange hole.
Figure 4:
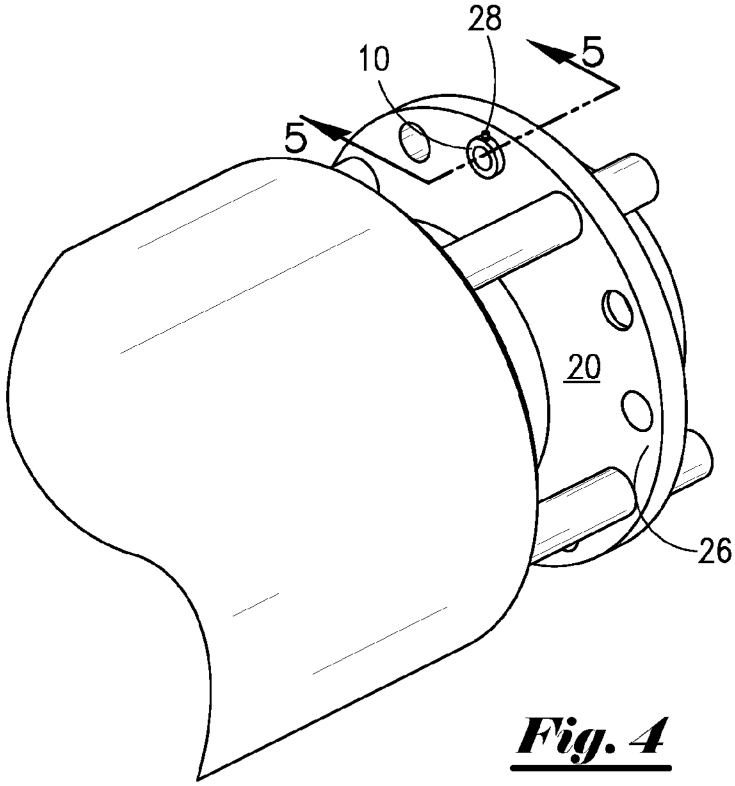
FIG. 4 is a back isometric view of the lift bushing inserted through the pipe flange hole.

Referring now to FIGS. 3 and 4, lift bushing 2 may be insertable through flange hole 18 in flange 20, which is operatively connected to pipe 22. Flange 20 may be formed integrally with pipe 22. Alternatively, flange 20 may be formed separately and attached to pipe 22. Pipe 22 may be any type of pipe, and preferably a heavy pipe such as a marine riser. In the inserted position, second end surface 12 of lift bushing 2 may form a continuous flat surface with connection surface 24 of flange 20. Also in the inserted position, first end surface 10 of lift bushing 2 may extend beyond rear surface 26 of flange 20 such that fasteners 28 may be inserted into fastener bores 16. Fasteners 28 may have a threaded outer surface capable of engaging fastener bores 16.

Figure 5:
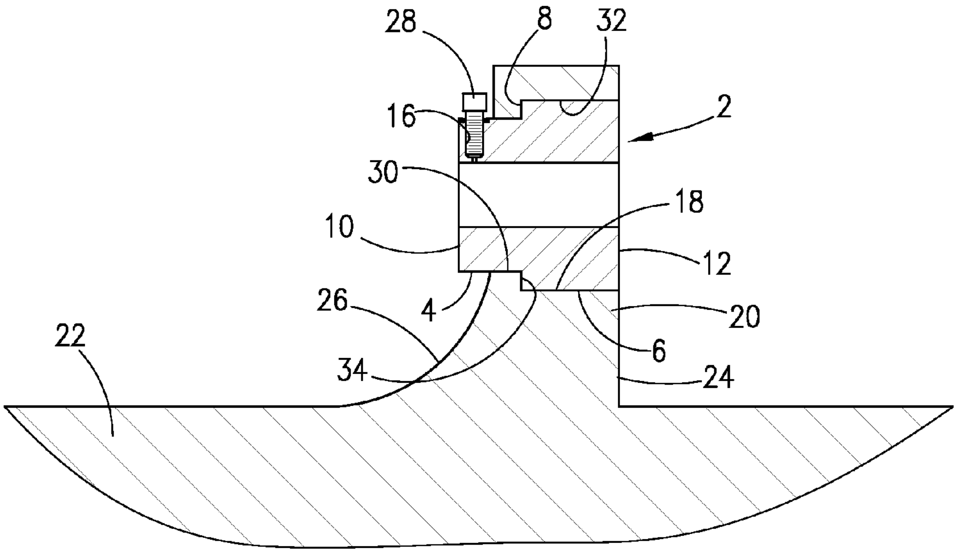
FIG. 5 is a sectional view of the lift bushing of FIG. 4 taken along line 5-5.

FIG. 5 is a cross-sectional view of lift bushing 2 inserted through flange hole 18 in flange 20. Flange hole 18 may have first inner surface 30, second inner surface 32, and shoulder 34 interconnecting first and second inner surfaces 30, 32. First end surface 10 of lift bushing 2 may be inserted through flange hole 18 from connection surface 24 to beyond rear surface 26 until shoulder 8 of lift bushing 2 engages shoulder 34 of flange hole 18. Fasteners 28 may then be inserted into fastener bores 16 in lift bushing 2. In this position, fasteners 28 may prevent movement of lift bushing 2 toward connection surface 24 of flange 20, and the engagement of shoulder 8 of lift bushing 2 with shoulder 34 of flange hole 18 may prevent further movement of lift bushing 2 toward rear surface 26 of flange 20. In this way, lift bushing 2 may be secured within flange hole 18.

First and second inner surfaces 30, 32 of flange hole 18 may have differing diameters such that lift bushing 2 is only insertable through flange hole 18 in one direction. This arrangement may ensure that fastener bores 16 are positioned beyond rear surface 26 of flange 20 instead of beyond connection surface 24 of flange 20. In this arrangement, second end surface 12 of lift bushing 2 may be flush with connection surface 24 of flange 20 such that flange 20 of pipe 22 may be connected to a flange of another pipe without removing lift bushing 2 from flange hole 18.

Figure 6:
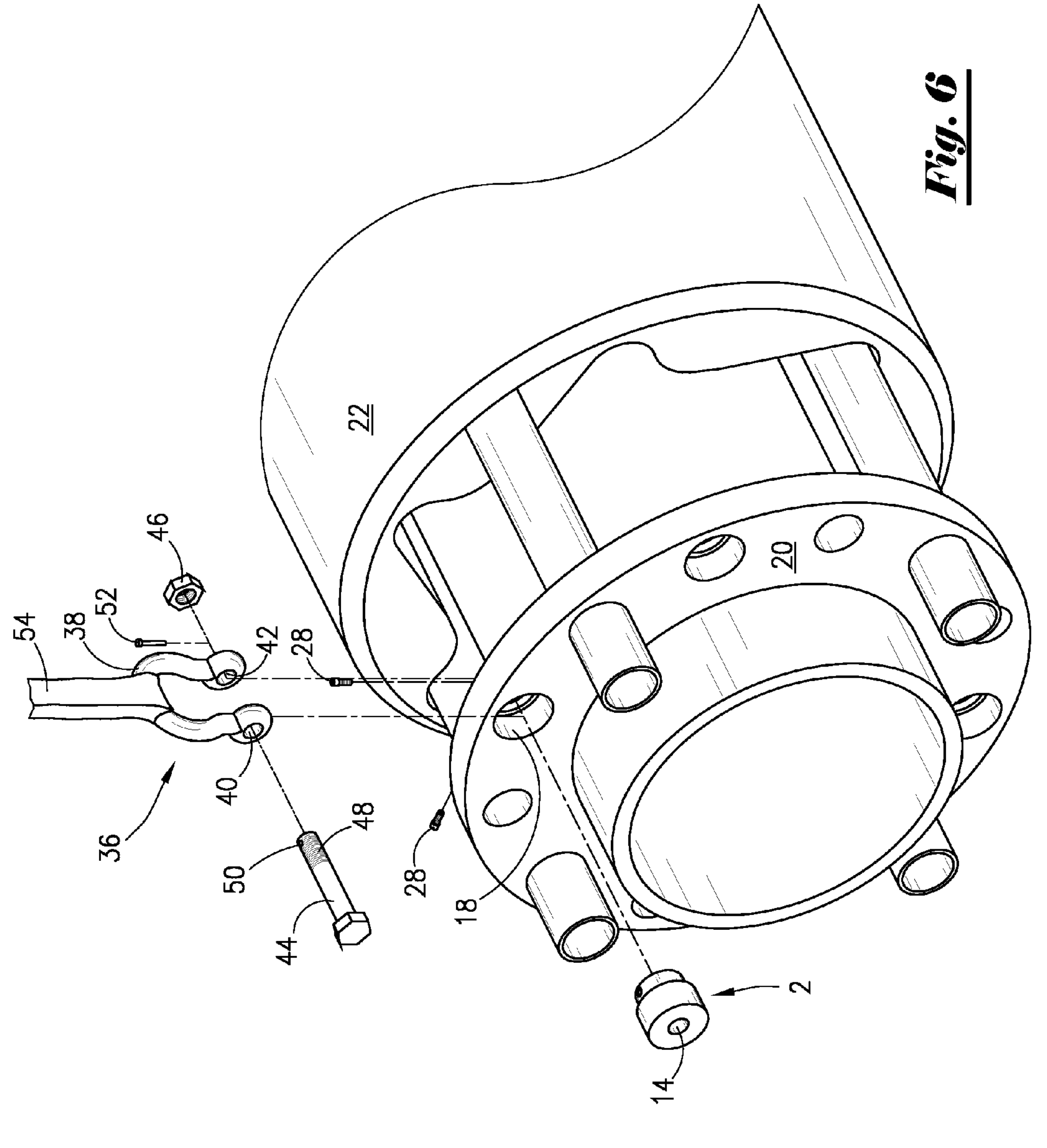
FIG. 6 is an exploded view of the lift bushing and a shackle assembly.

With reference now to FIG. 6, shackle assembly 36 may include shackle 38 having first bore 40 and second bore 42. Shackle 38 may be capable of fitting over lift bushing 2 in the inserted position within flange hole 18 such that first and second bores 40 and 42 of shackle 38 may be aligned with inner bore 14 of lift bushing 2. Shackle assembly 36 may also include bolt 44, which may be insertable through first bore 40 of shackle 38, inner bore 14 of lift bushing 2, and second bore 42 of shackle 38. Shackle assembly 36 may also include nut 46, which may be capable of engaging threaded portion 48 of bolt 44 extending beyond second bore 42 of shackle 38. Bolt 44 may include fastener bore 50, which may be dimensioned to receive fastener 52. With fastener 52 disposed within fastener bore 50 of bolt 44 and with nut 46 disposed around threaded portion of bolt 44, shackle 38 may be secured to lift bushing 2. Shackle assembly 36 may further include cord 54, which may be affixed to an upper end of shackle 38. Cord 54 may be a rope or chain, and may be permanently or temporarily affixed to shackle 38.

Figure 7:
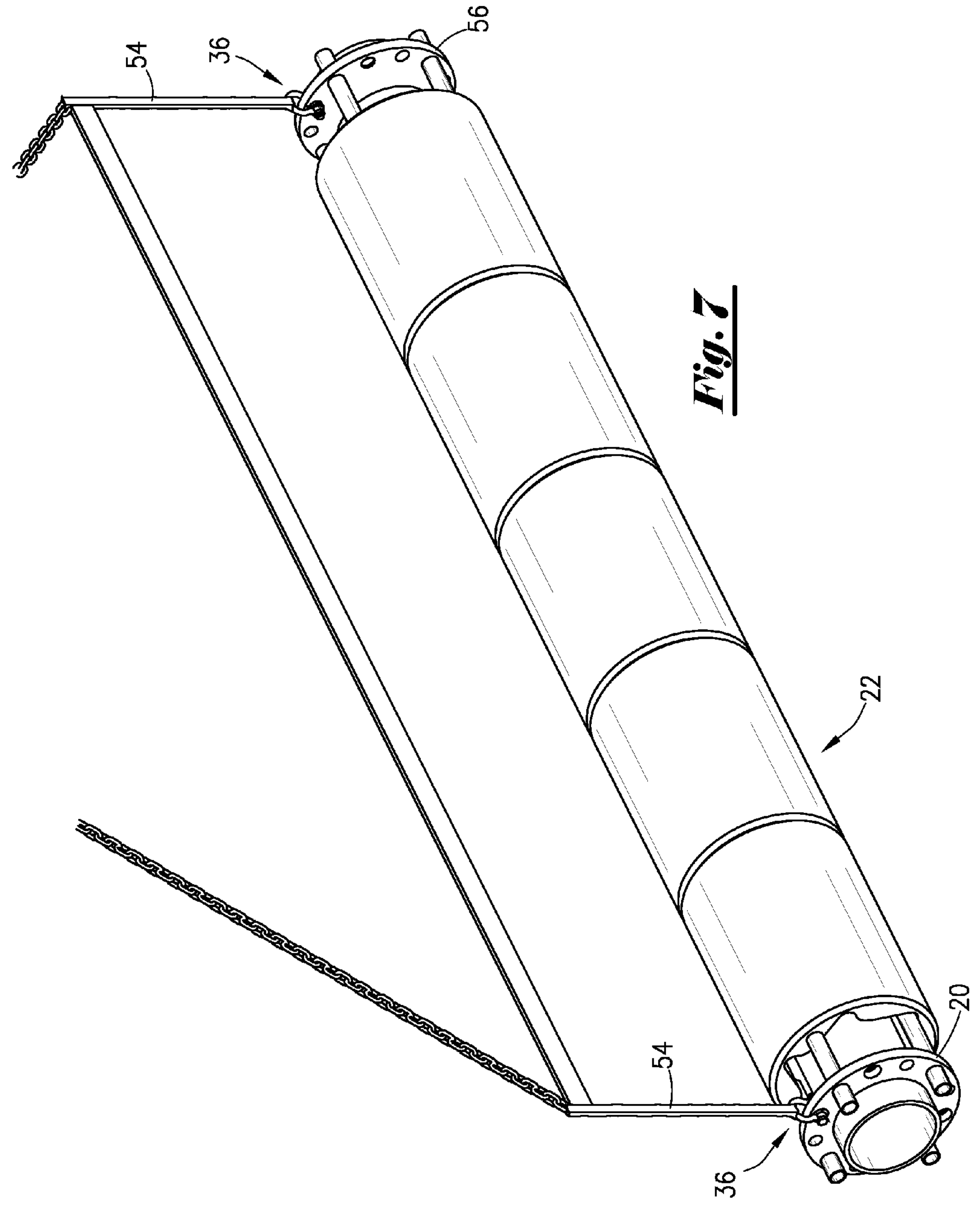
FIG. 7 is an isometric view of the lift bushing and shackle assembly connected to pipe flanges.

FIG. 7 illustrates lift bushing 2 affixed to flange 20 of pipe 22 and shackle assembly 36 affixed to lift bushing 2. Another lift bushing 2 may be affixed to flange 56 of pipe 22 and another shackle assembly 36 may be affixed to the other lift bushing 2. Cords 54 may be operatively connected to a lifting device (not shown) such as a crane. In this way, lift bushing 2 may enable the lifting device to lift pipe 22 in a substantially horizontal position and move pipe 22 to another location. Alternatively, only one lift bushing 2 may be affixed to flange 20 and pipe 22 may be lifted in a substantially vertical position. However, this arrangement may not be practical for lifting pipes of substantial length.

Once pipe 22 is moved to the desired location, shackle assemblies 36 may be removed from lift bushings 2. Because of their light weight and flat fit with connection surfaces 24, lift bushings 2 may remain positioned within flange holes 18 even when flanges 20, 56 are connected to flanges of other pipes. For example, if pipe 22 is a marine riser pipe section, lift bushings 2 may remain secured within flange holes 18 as the marine riser pipe section is flangedly attached to other marine riser pipe sections, and as the string of marine riser pipe sections are positioned underwater between a drilling rig and a subsea blow out preventer stack.

While preferred embodiments of the present invention have been described, it is to be understood that the embodiments are illustrative only and that the scope of the invention is to be defined solely by the appended claims when accorded a full range of equivalents, many variations and modifications naturally occurring to those skilled in the art from a review hereof.

The invention claimed is:

1. A lift bushing comprising:

an inner bore extending from a first end surface of said lift bushing to a second end surface of said lift bushing;

a first outer surface extending from the first end surface to a shoulder;

a second outer surface extending from the shoulder to the second end surface, the shoulder interconnecting said first outer surface and said second outer surface, wherein a diameter of the second outer surface is greater than a diameter of the first outer surface;

a fastener bore through the first outer surface;

wherein said lift bushing is dimensioned to be inserted through a flange hole in a flange of a pipe to facilitate lifting of said pipe, and wherein said fastener bore is dimensioned to receive a fastener for retaining said lift bushing within said flange hole.

2. The lift bushing of claim 1, wherein when said lift bushing is inserted through said hole in said flange said second end surface and a connection surface of said flange are coplanar and said first end surface extends beyond a rearward surface of said flange such that said fastener bore of said first outer surface is disposed external to said flange hole.

3. The lift bushing of claim 1, wherein the first outer surface and the second outer surface are generally cylindrically shaped.

4. The lift bushing of claim 1, wherein said shoulder of said lift bushing is configured to abut a shoulder in said flange hole for retaining the lift bushing in the flange hole with the fastener disposed through the fastener bore.

5. The lift bushing of claim 1, wherein said fastener comprises a threaded portion for threadedly engaging said fastener bore.

6. The lift bushing claim 1, wherein said inner bore is dimensioned to receive a portion of a shackle assembly to facilitate lifting of said pipe.

7. A pipe lifting system comprising:

a flange operatively attached to a pipe, said flange comprising a flange hole;

a lift bushing comprising an inner bore extending from a first end surface of said lift bushing to a second end surface of said lift bushing, a first outer surface extending from the first end surface to a shoulder, a second outer surface extending from the shoulder to the second end surface, the shoulder interconnecting the first outer surface and the second outer surface, wherein a diameter of the second outer surface is greater than a diameter of the first outer surface, and a fastener bore through the first outer surface; wherein said lift bushing is dimensioned to fit through said flange hole to facilitate lifting of said pipe; and wherein said fastener bore is dimensioned to receive a fastener for retaining said lift bushing within said flange hole; and shackle assembly capable of selectively engaging said inner bore of said lift bushing, said shackle assembly operatively connected to a lifting device for lifting said pipe.

8. The pipe lifting system of claim 7, wherein said flange is integrally formed with said pipe.

9. The pipe lifting system of claim 7, wherein said pipe comprises a marine riser.

10. The pipe lifting system of claim 7, wherein said lifting device comprises a crane.

11. The pipe lifting system of claim 7, wherein said shoulder of said lift bushing is configured to abut a shoulder in said flange hole for retaining the lift bushing in the flange hole with the fastener disposed through the fastener bore.

12. The pipe lifting system of claim 11, wherein said shackle assembly comprises:

a shackle with a first bore and a second bore both capable of being aligned with said inner bore of said lift bushing;

a bolt insertable through said first bore of said shackle, said inner bore of said lift bushing, and said second bore of said shackle; and a nut capable of threadedly engaging said bolt to secure said shackle to said lift bushing.

13. The pipe lifting system of claim 7, further comprising:

a second flange operatively attached to a second end of said pipe, said second flange comprising a second flange hole;

a second lift bushing insertable through said second flange hole; and a second shackle assembly capable of selectively engaging an inner bore of said second lift bushing, said second shackle assembly operatively connected to said lifting device for lifting said pipe.

14. The pipe lifting system of claim 13, wherein said first flange and said second flange are integrally formed with said pipe.

15. The pipe lifting system of claim 13, wherein said pipe comprises a marine riser.

16. A method of lifting a pipe, comprising the steps of:

(a) providing a pipe lifting system, said pipe lifting system comprising: a flange operatively attached to said pipe, said flange comprising a flange hole; lift bushing comprising a first out surface, a second outer surface, a shoulder interconnecting said first outer surface and said second outer surface, an inner bore extending from a first end surface of said lift bushing to a second end surface of said lift bushing, and a fastening mechanism operatively associated with said first outer surface or said second outer surface; wherein said lift bushing is dimensioned to be inserted through said flange hole to facilitate lifting of said pipe; and wherein said fastening mechanisms capable of retaining said lift bushing within said flange hole; and a shackle assembly;

(b) inserting said lift bushing through said flange hole;

(c) securing said lift bushing in said flange hole with said fastening mechanism;

(d) selectively engaging said inner bore of said lift bushing with said shackle assembly;

(e) operatively attaching said shackle assembly to a lifting device;

(f) lifting said pipe with said lifting device;

(g) lowering said pipe with said lifting device;

(h) selectively disengaging said assembly from said inner bore of said lift bushing; and (i) operatively connecting a flange of a second pipe to said flange while retaining said lift bushing within said flange hole.

17. The method of claim 16, wherein said lifting comprises a crane.

18. The method of claim 16, wherein said pipe comprises a marine riser.

19. The method of claim 16, wherein said pipe lifting system further comprises a second flange operatively attached to said pipe, said second flange comprising a second flange hole; a second lift bushing; and a second shackle assembly; wherein step (b) further comprises inserting said second lift bushing through said second flange hole; wherein step (c) securing said second lift bushing in said second flange hole with a fastening mechanism of said second lift bushing; wherein step (d) further comprises selectively engaging an inner bore of said second lift bushing with said second shackle assembly; wherein step (e) further comprises operatively attaching said second shackle assembly to said lifting device; wherein step (h) further comprises selectively disengaging said second shackle assembly from said inner bore of said second lift bushing; and wherein step (i) further comprises operatively connecting a flange of a third pipe to said second flange while retaining said second lift bushing within said second flange hole.

* * * * *